United States Patent
Krogdahl et al.

(10) Patent No.: US 6,972,413 B1
(45) Date of Patent: Dec. 6, 2005

(54) UV CURING SYSTEM

(75) Inventors: James Robert Krogdahl, East Berlin, CT (US); Patrick Joseph Courtney, Manchester, CT (US)

(73) Assignee: Henkel Corporation, Rocky Hill, CT (US)

( * ) Notice: Subject to any disclaimer, the term of this patent is extended or adjusted under 35 U.S.C. 154(b) by 15 days.

(21) Appl. No.: 10/799,762

(22) Filed: Mar. 15, 2004

Related U.S. Application Data

(60) Provisional application No. 60/472,487, filed on May 22, 2003.

(51) Int. Cl.[7] .............................................. H01J 27/00

(52) U.S. Cl. ........................... 250/432 R; 250/455.11; 250/461.1; 250/365; 250/372

(58) Field of Search ............................ 430/280.1, 312, 430/270.1, 253; 250/455.11; 362/285, 287, 362/288; 356/39, 40; 600/310, 315

(56) References Cited

U.S. PATENT DOCUMENTS

| | | | | |
|---|---|---|---|---|
| 4,412,048 A | * | 10/1983 | Dixon et al. | 428/414 |
| 4,897,911 A | * | 2/1990 | Keldany et al. | 29/429 |
| 5,227,637 A | * | 7/1993 | Herold et al. | 250/438 |
| 5,250,387 A | * | 10/1993 | Held et al. | 430/253 |
| 5,439,578 A | * | 8/1995 | Dovichi et al. | 204/603 |
| 5,933,226 A | * | 8/1999 | Yamanishi | 356/39 |
| 6,103,148 A | * | 8/2000 | Su et al. | 264/1.38 |
| 6,520,663 B1 | * | 2/2003 | Holmes et al. | 362/285 |
| 2004/0092946 A1 | * | 5/2004 | Bagge et al. | 606/93 |

FOREIGN PATENT DOCUMENTS

WO    WO 2066220 A1 *  8/2002   ........... B29C 35/02

* cited by examiner

*Primary Examiner*—Nikita Wells
*Assistant Examiner*—Johnnie L Smith, II
(74) *Attorney, Agent, or Firm*—Steven C. Bauman

(57) ABSTRACT

The present invention relates generally to systems for directing light-based radiation onto a light curable material. More particularly, the present invention is directed to a device for uniformly exposing a UV curable material to UV energy.

8 Claims, 4 Drawing Sheets

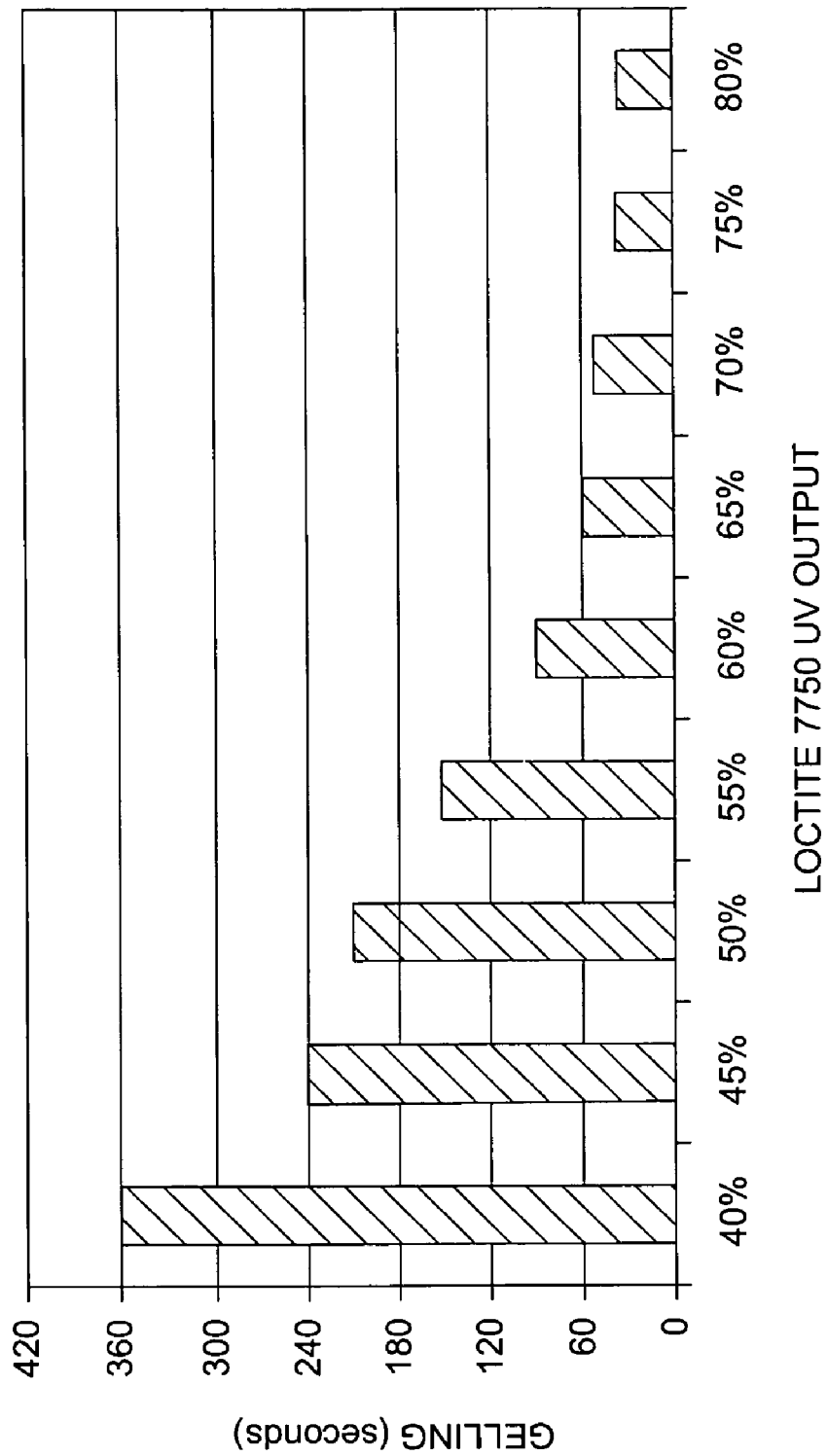

UV CURING SYSTEM

This application claims benefit of application Ser. No. 60/472,487, filed May 22, 2003.

FIELD OF THE INVENTION

The present invention relates generally to systems for directing light-based radiation onto a light curable material. More particularly, the present invention is directed to a device for uniformly exposing a UV curable material to UV energy.

BACKGROUND OF THE INVENTION

Light-based curing systems, particularly UV curing systems are well known. These systems apply UV energy in the form of UV light to a material which may be initiated and/or cured by the irradiated UV energy. These materials may include UV curable adhesive such as epoxies.

In many automated systems which use such epoxies, the epoxy is applied to a work piece from a dispensing vessel such as a pipette or syringe. The epoxy must be applied to the work piece shortly after exposure to the UV radiation.

Light-based curing systems are known where the epoxy is initiated or cured in the pipette or syringe, just prior to application. In order to assure proper exposure to UV light, these systems employ an apparatus which attempts to deliver the UV light uniformly about the vessel containing the epoxy.

One such system which is commercially available is a cure ring manufactured by EXFO Photonic Solutions Inc., Quebec Canada. Such a system includes a ring-shaped housing where the epoxy vessel is supported centrally within the ring. A light guide delivers light to discrete locations about the ring to expose the vessel to the light circumferentially therabout.

This system has certain drawbacks. First, the light from the light guide is distributed to multiple points about the ring. This diminishes the intensity of the light applied to the vessel. Second, the ring supports the multiple light points on a common plane. This tends to apply the UV radiation to only a small extent of the epoxy held in the pipette or syringe.

It is desirable to provide a UV curing system which permits uniform curing or injection of a UV curable material contained in a longitudinal vessel.

SUMMARY OF THE INVENTION

The present invention provides a device for accommodating a curable material contained in a longitudinal vessel for exposure to a light-based radiation. The system includes an elongate housing having a central bore extending therethrough. The bore defines a curing location for accommodating the longitudinal vessel. The bore further includes at least two aligned longitudinally spaced transversely directed light guide apertures extending into communication with said bore. The housing directs the radiation injected into said bore from said light guide apertures substantially perimetrically about said vessel along a longitudinal extent thereof.

The present invention further provides a system for exposing a curable material contained in a longitudinal vessel to light-based radiation. The system includes a light block having a longitudinal bore therethrough. The bore accommodates a vessel therein. A pair of spaced apart longitudinally aligned transversely extending light apertures are in communication with said bore. A pair of light guides are supported in said pair of apertures for delivering said light-based radiation into said bore. The light block directs said light-based radiation to said vessel along a longitudinal extent thereof.

BRIEF DESCRIPTION OF THE DRAWINGS

FIG. 8 is a chart comparing UV output versus gel time of the epoxy.

DETAILED DESCRIPTION OF THE PREFERRED EMBODIMENT

The present invention provides a system and device for delivery of light-based radiation energy to a curable material which is contained in a vessel typically used to dispense the material in a conventional automated process. The present invention may be used with any material wherein light-based energy may be used to initiate the curing process. Such materials include, but are not limited to, adhesives such as epoxies or acrylics which contain photo initiators. With such materials, curing can be initiated by exposure to radiation in the electromagnetic spectrum such as ultraviolet (UV) or infra-red (IR) light.

While not limited thereto, the present invention will be described with respect to delay cure cationic (DCC) UV curable epoxies.

Moreover, these UV DCC epoxies have a short pot life after UV exposure. Thus, in automated applications the epoxy should be dispensed immediately after UV exposure. Many automated systems deliver the epoxy from an elongate vessel such as a pipette, or syringe. Thus, it is desirable to expose the epoxy in the pipette or syringe to the UV light during the automated process just prior to application.

The present invention provides an improved system for exposing the epoxy contained in the vessel to uniform UV light.

Figure 1:
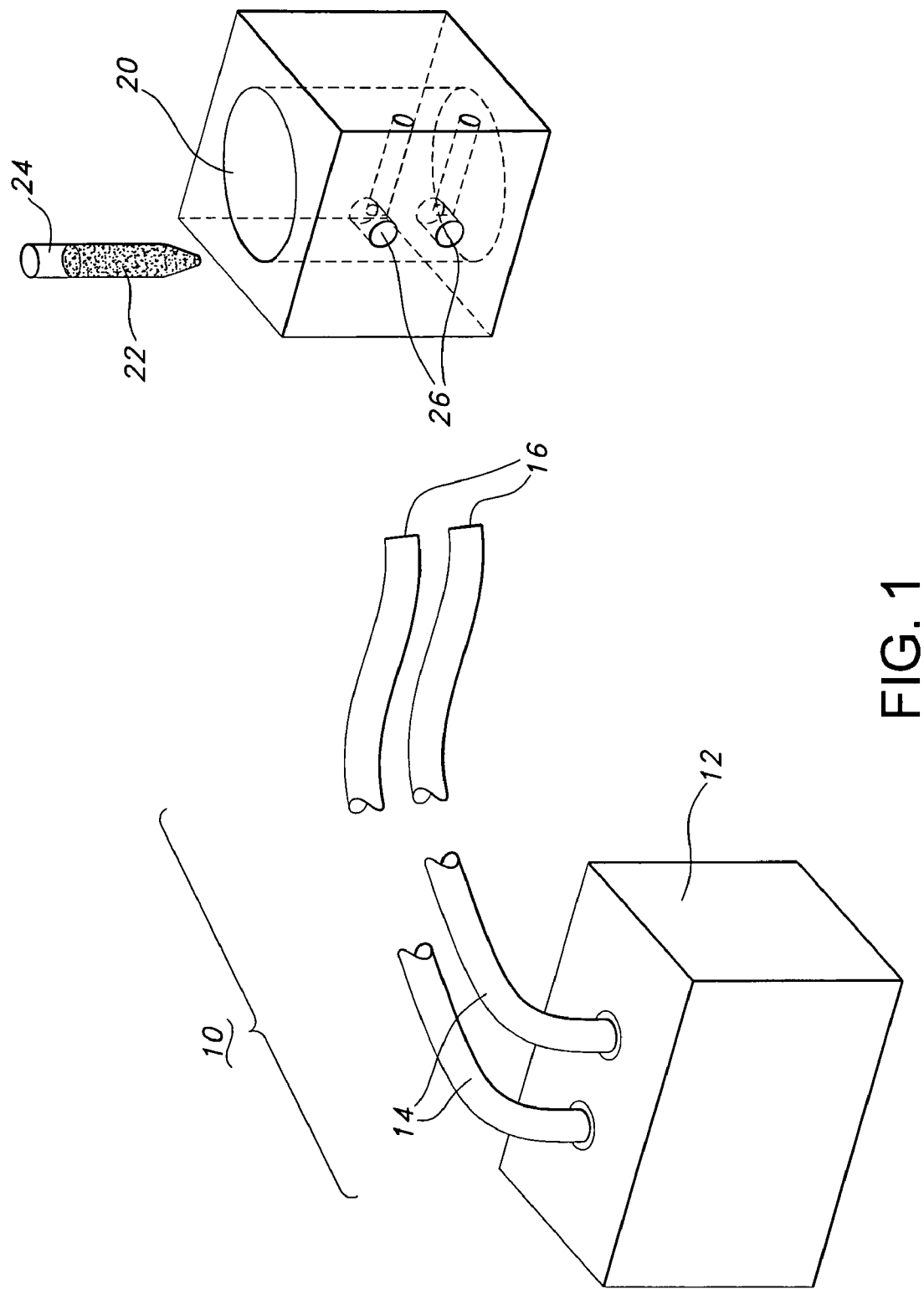
FIG. 1 is a schematic representation of the system of the present invention.
Figure 3:
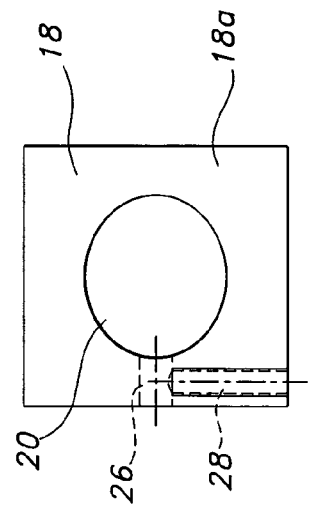
FIGS. 3–5 are side, top and front plan views respectively of the light housing of FIG. 2.
Figure 2:
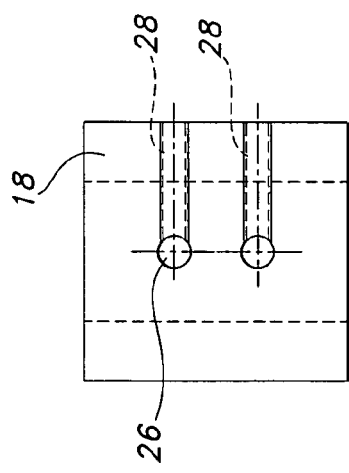
FIG. 2 is a perspective view of a light housing of a preferred embodiment of the present invention.
Figure 4:
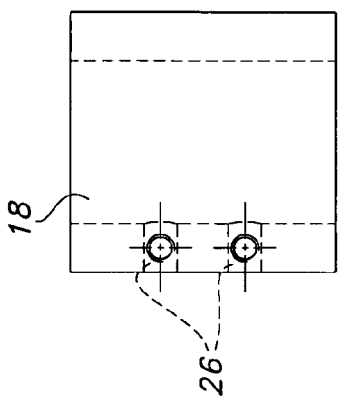

Referring now to FIG. 1, a UV curing system in accordance with the present invention is shown. System 10 includes a source 12 of UV light. In the present illustrative embodiment, source 12 may include a Loctite Zeta 7750, programmable UV output device. This output device is cable of delivering irradiation levels of varying intensity and time.

System 10 further includes a pair of 3 mm. UV light guides 14 which are capable of transmitting light from the source 12, through end faces 16 thereof. Light guides 14 are well known in the art.

Additionally, system 10 includes a light block or housing 18. Housing 18 is an elongate member typically formed of aluminum having an elongate central bore 20 therethrough. The housing will be described in further detail hereinbelow.

A small amount of epoxy 22 is contained in a vessel 24, which in the present embodiment is a micropipette glass tube. Such a tube permits the automated dispensing of a measured volume of epoxy. In the present embodiment, a 25–40 µl. volume of epoxy is contemplated.

The system 10 of the present invention supplies UV light from the source 12 through the light guides 14 into the bore 20 of housing 18. The vessel 24 may be positioned at a precise location within the bore so that the volume of epoxy 22 is uniformly initiated in the vessel 24 for immediate subsequent dispensing.

Referring now to FIGS. 2–5, the light housing 18 may be described in further detail. Light housing 18 includes a longitudinal extent 1 and a transverse extent t. The housing itself may be of any desirable shape and is not limited to the rectangular block shown herein. Housing 18 includes central bore 20 extending longitudinally therethrough between opposed ends 18a and 18b. Housing 18 includes a pair of light guide receiving apertures 26 which accommodate the ends of light guides 14. Apertures 26 extend from one side 18c of housing 18 transversely into communication with central bore 20. The apertures 26 are longitudinally spaced and aligned along the direction of arrow 1. In the present illustrative embodiment, apertures 26 are spaced apart a distance of approximately 0.50 in. A pair of securement holes 28 extend from an adjacent face 18d into communication with apertures 26. Securement holes 28 accommodate set screws (FIGS. 6 and 7) which fix the ends of light guide 14 in aperture 26 so as to direct the light emitting from said end faces 16 into said bore 20.

Figure 5:
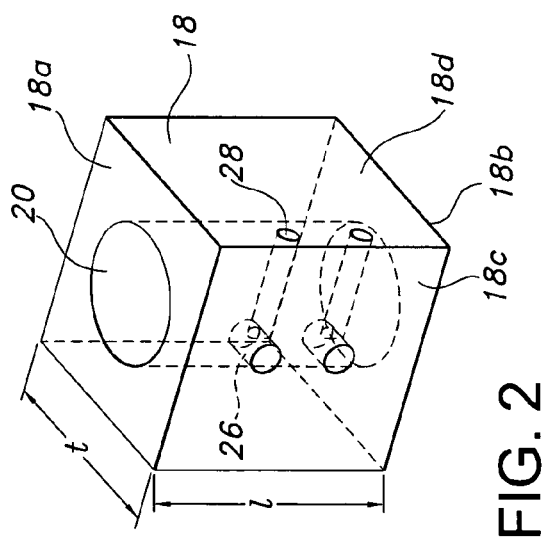

Referring more specifically to FIG. 5, it can been seen that the shape of the bore 20 in the present embodiment is elliptical. While an elliptical bore is preferred other shapes such circular may also be employed.

The bore 20 has an elliptical cross-sectional shape and defines a major and minor axis and a pair of focal points. The major axis may be of a dimension approximately 25 mm. while the minor axis may have a dimension of approximately 21.5 mm. The focal points 30 and 32 of the ellipsis defined by bore 20 are used to maximize the light emanating from the light guides 14 onto the epoxy vessel 24.

Apertures 26 are aligned with and adjacent to focal point 30 generally co-linearly with the major axis of the ellipsis. The other focal point 32 defines a location for the accommodation of vessel 24. Using well known geometric principles, light emitting from one focal point will be directed toward the other focal point. This assures that light from the light guides 14 will be completely and uniformly directed about the vessel 24. In this regard, the inner surface of the bore 20 is highly polished preferably by an electropolishing process known as an ALZAK process to maximize the reflection of the UV light.

Moreover, the housing 18 of the present invention directs the UV light along a longitudinal extent of the vessel 24. The light guides 14 are located in vertically spaced positions. Thus, the light extends along the longitudinal extent 1 of housing 18. This assures more uniform distribution of light along the length of the vessel 24.

Figure 7:
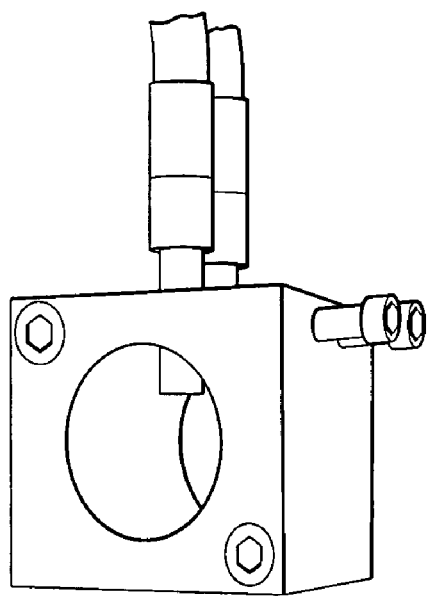
FIGS. 6 and 7 are photographs showing a preferred embodiment of the light block or housing of the present invention.
Figure 6:
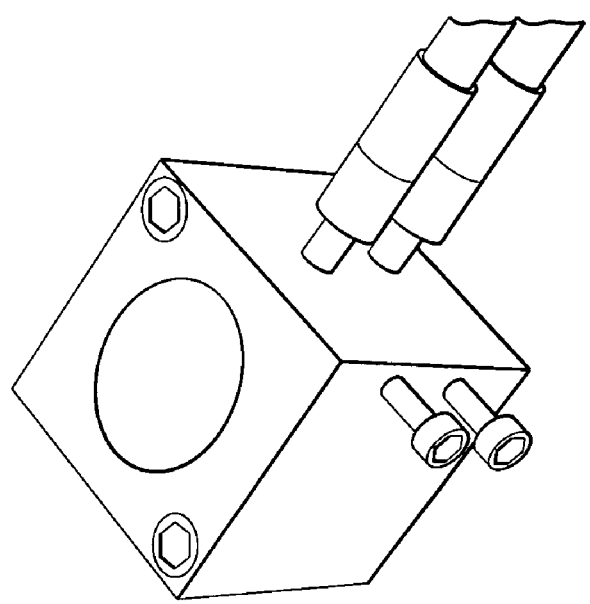

A preferred embodiment of housing 18 is shown in the photographs of FIGS. 6 and 7.

A UV apparatus constructed in accordance with the present invention was evaluated with the following results:

Adhesives Evaluated:

Table 1 details the adhesive that was evaluated in this project.

TABLE 1

Adhesive Evaluated

| Product Number | Batch Number | Product Description |
| --- | --- | --- |
| DP080702-1 | 022703-2PM | Delayed cure cationic (DCC) epoxy |

Equipment Used:
   Loctite Zeta 7750, programmable UV output device
   Loctite UV Focus chamber
   3 mm dual UV light guide
   Positive displacement digital micropipette with glass barrel.

Laboratory Conditions:
Temperature: 71° F.
Relative Humidity: 45%

Test Methods:
1. 25 μl. of DCC epoxy (1" stroke of plunger) was drawn into the micropipette glass tube and exposed to varying levels of UV radiation from the Loctite 7750 output device.
2. The DCC epoxy was dispensed onto a polypropylene plate.
3. The time was recorded for the first signs of gelled material in the DCC epoxy.

Setup Of Loctite Zeta 7750:
1. The dual 3 mm light guides were fitted to the Loctite Zeta 7750 programmable UV output device.
2. 3 mm light guide outputs were inserted into the Loctite Zeta UV focus chamber and locked in position.
3. The Loctite 7750 Zeta output device was linked to a laptop computer running 7750 programming software.
4. The Loctite 7750 Zeta output device was programmed for increasing power levels from 40–80% in 5% increments.

Test Procedure:
1. DCC epoxy exposed to UV radiation using the Loctite Zeta 7750 output device and the UV focus chamber as shown below.
2. After UV irradiation, the adhesive was dispensed as a drop onto a polypropylene plate.
3. The DCC epoxy was tested for gelled material by lifting the adhesive with a thin piece of plastic. The time required to identify small amounts of gelled material was recorded.

Results:

TABLE 3

Irradiation Levels and Gel Time of DCC Epoxy

| Test No. | Loctite 7750 Output | Irradiation Time | Gelling (min:sec) |
| --- | --- | --- | --- |
| 1 | 40% | 10 seconds | 6:00 |
| 2 | 45% | 10 seconds | 4:00 |
| 3 | 50% | 10 seconds | 3:30 |
| 4 | 55% | 10 seconds | 2:30 |
| 5 | 60% | 10 seconds | 1:30 |
| 6 | 65% | 10 seconds | 1:00 |
| 7 | 70% | 10 seconds | 0:45–1:00 |
| 8 | 75% | 10 seconds | 0:30–0:45 |
| 9 | 80% | 10 seconds | 0:30–0:45 |

The gel time was measured when the first sign of gelled material was identified in the DCC epoxy liquid. The time for the entire drop of adhesive to gel was considerably longer than the results recorded.

The gel time is difficult to measure accurately. For tests 1–6, the drop of adhesive was tested for gelled material every 30 seconds. For tests 7–9, the material was tested at 15-second intervals.

The effect of the radiation is plotted in the graft of FIG. 8.

What is claimed:

1. A device for accommodating a curable material contained in a longitudinal vessel for exposure to radiation in the electromagnetic spectrum, comprising:
    an elongate housing having a central bore extending therethrough, said bore defining a curing location for accommodating said longitudinal vessel;
    said bore further including at least two aligned longitudinally spaced transversely directed light guide apertures extending into communication with said bore;
    whereby said housing directs said radiation injected into said bore from said light guide apertures substantially perimetrically about said vessel along a longitudinal extent thereof.

2. A device of claim 1 wherein said central bore is generally elliptically shaped and wherein said curing location is located at one focus defined by said elliptical shape of said bore.

3. A device of claim 2 wherein said light guide apertures are aligned adjacent the other focus defined by said elliptical shape of said bore.

4. A device of claim 1 wherein said radiation is UV radiation.

5. A system for exposing a curable material contained in a longitudinal vessel to radiation in the electromagnetic spectrum comprising:
    a light block having a longitudinal bore therethrough, said bore accommodating said vessel therein;
    a pair of spaced apart longitudinally aligned transversely extending light apertures in communication with said bore; and
    a pair of light guides supported in said pair of apertures for delivering said radiation into said bore;
    wherein said light block directs said radiation to said vessel along a longitudinal extent thereof.

6. A system of claim 5 wherein said longitudinal bore is elliptically shape and wherein said vessel is accommodated at one focal point defined by said elliptical shape.

7. A system of claim 6 wherein said light apertures are aligned adjacent the other focal point defined by said elliptical shape.

8. A system of claim 5 wherein said radiation is UV radiation.

* * * * *